United States Patent
Nishimura

(10) Patent No.: US 8,553,538 B2
(45) Date of Patent: Oct. 8, 2013

(54) PACKET RELAY DEVICE AND CONGESTION CONTROL METHOD

(75) Inventor: Kazuto Nishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 378 days.

(21) Appl. No.: 12/862,420

(22) Filed: Aug. 24, 2010

(65) Prior Publication Data

US 2011/0051604 A1 Mar. 3, 2011

(30) Foreign Application Priority Data

Aug. 25, 2009 (JP) .................................. 2009-194422

(51) Int. Cl.
*H04L 12/26* (2006.01)
*H04L 12/28* (2006.01)

(52) U.S. Cl.
USPC .......................................... 370/229; 370/412

(58) Field of Classification Search
USPC ........................... 370/229–235, 401, 412–418
See application file for complete search history.

(56) References Cited

U.S. PATENT DOCUMENTS

| | | | |
|---|---|---|---|
| 6,512,741 B1 | 1/2003 | Kohzuki et al. | |
| 6,920,109 B2 | 7/2005 | Yazaki et al. | |
| 7,035,216 B2 | 4/2006 | Kikuchi et al. | |
| 7,061,862 B2 | 6/2006 | Horiguchi et al. | |
| 7,382,728 B2 * | 6/2008 | Chen et al. | 370/235 |
| 7,522,525 B2 * | 4/2009 | Mieno et al. | 370/235 |
| 7,768,919 B1 * | 8/2010 | Conway | 370/232 |
| 2004/0196792 A1 * | 10/2004 | Davies et al. | 370/235 |
| 2005/0147032 A1 * | 7/2005 | Lyon et al. | 370/229 |
| 2007/0058649 A1 * | 3/2007 | Kytomaa et al. | 370/412 |
| 2007/0195761 A1 * | 8/2007 | Tatar et al. | 370/389 |
| 2009/0196194 A1 * | 8/2009 | Paloheimo et al. | 370/252 |
| 2010/0046368 A1 * | 2/2010 | Kaempfer et al. | 370/231 |

FOREIGN PATENT DOCUMENTS

| | | |
|---|---|---|
| JP | 2000-031974 | 1/2000 |
| JP | 2001-111556 A | 4/2001 |
| JP | 2001-326688 | 11/2001 |
| JP | 2002-185501 | 6/2002 |
| JP | 2002-330165 | 11/2002 |
| JP | 2004-104417 A | 4/2004 |

OTHER PUBLICATIONS

Maeda et al., "Buffer Management with Delay Constraints for Differentiated Services", Technical Report of IEICE, NS2003-357, The Institute of Electronics, Information and Communication Engineers, Feb. 27, 2004, vol. 103, No. 690, pp. 321-326 (English Abstract).
"Japanese Office Action" mailed by JPO and corresponding to Japanese application No. 2009-194422 on Apr. 16, 2013. Translation of the relevant part, p. 1, line 19 to p. 3, line 12, and p. 3, Line 16 to 24, of the Office Action.

* cited by examiner

*Primary Examiner* — Hong Cho
(74) *Attorney, Agent, or Firm* — Fujitsu Patent Center

(57) ABSTRACT

A packet relay device including a plurality of queues which store packets waiting to be transmitted, a congestion detection unit which detects a congestion state of the plurality of queues and selects one or more queues from among the plurality of queues based on the congestion state, a distribution unit which separates a packet addressed to one or more of the queues selected by the congestion detection unit from a sequence of packets before being stored in the plurality of queues, and a discard unit which discards, at a prescribed probability, a packet addressed to one or more of the queues separated by the distribution unit.

16 Claims, 15 Drawing Sheets

| SHAPER ID | UPSTREAM SHAPER | DOWNSTREAM SHAPER | QUEUE | CONGESTION FLAG |
|---|---|---|---|---|
| S1 | — | S10 | Q1 | 0 |
| S2 | — | S7 | Q2 | 1 |
| S3 | — | S7 | Q3 | 0 |
| S4 | — | S8 | Q4 | 1 |
| S5 | — | S8 | Q5 | 0 |
| S6 | — | S8 | Q6 | 0 |
| S7 | S2, S3 | S9 | — | 0 |
| S8 | S4, S5, S6 | S9 | — | 1 |
| S9 | S7, S8 | S10 | — | 0 |
| S10 | S1, S9 | — | — | 0 |

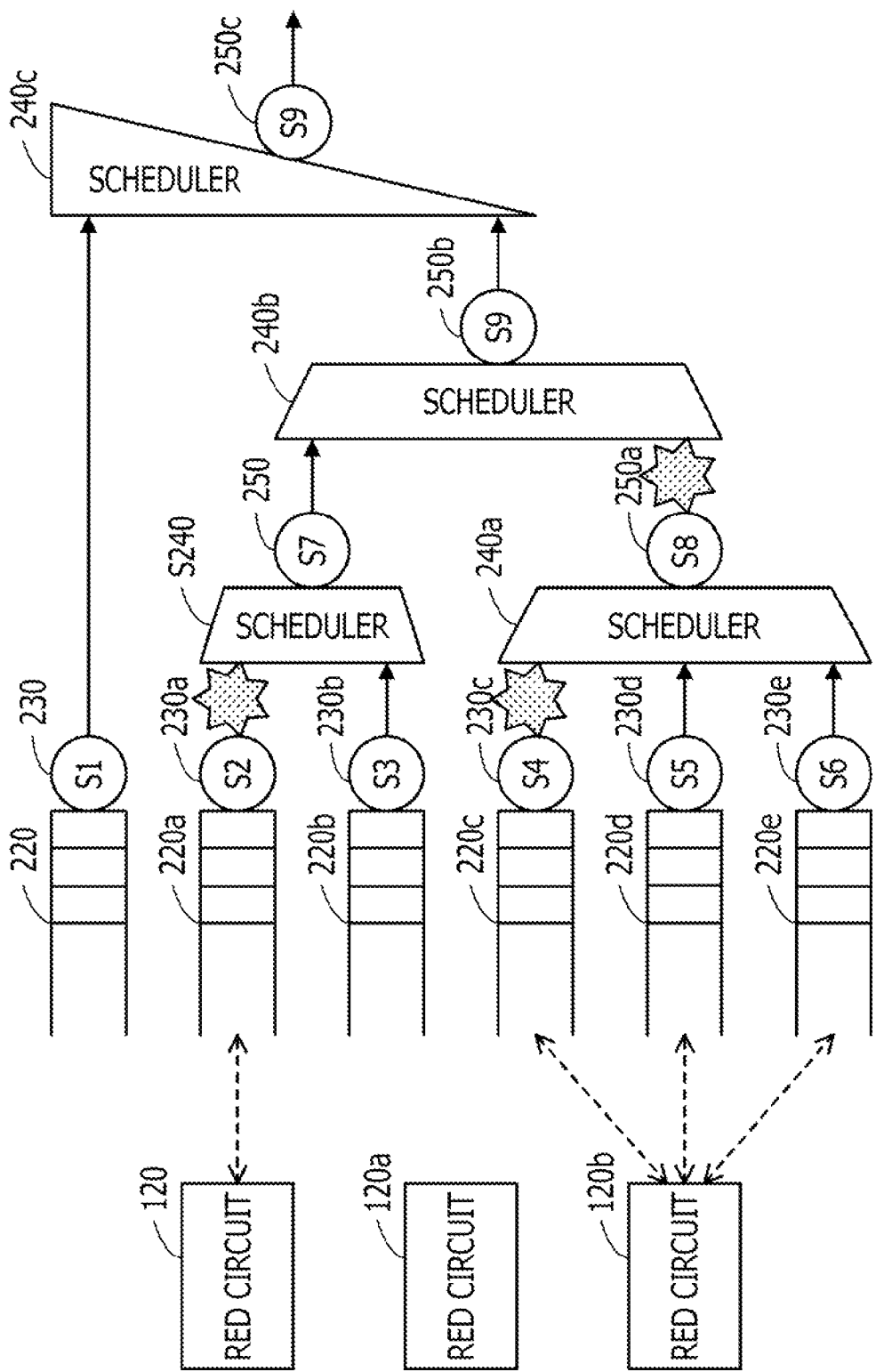

PACKET RELAY DEVICE AND CONGESTION CONTROL METHOD

CROSS-REFERENCE TO RELATED APPLICATIONS

This application is based upon and claims the benefit of priority from the prior Japanese Patent Application No. 2009-194422 filed on Aug. 25, 2009, the entire contents of which are incorporated herein by reference.

FIELD

The embodiments discussed herein are related to a packet relay device and a congestion control method.

BACKGROUND

In a packet communication system, congestion may occur in a relay device (equals to a "packet relay device") that relays a packet. One example, of a congestion control method is a tail drop method. In the tail drop method, a queue included in the relay device stores packets waiting to be transmitted. When the queue is full, the packets that arrive later are discarded until the queue has space. The tail drop method also includes a transmission device for transmitting a packet that performs control for decreasing a transmission rate (for example, a slow start algorithm) if there is no acknowledgement indicating that the packet is received from a reception device of a destination. Therefore, if the relay device discards the packets, the congestion may be eliminated.

In the tail drop method, however, when the queue is full, the packets that arrive later are unconditionally discarded even if the packet is transmitted from a transmission device whose transmission amount is large or a transmission device whose transmission amount is small. Therefore, a phenomenon (global synchronization) in which a plurality of transmission devices decreases the transmission rate all at once and traffic is temporally extremely decreased may occur. When the global synchronization occurs, a use rate of a network is decreased.

In contrast, there is another congestion control method called a "Random Early Detection (RED)" method. In the RED method, the arriving packets are stochastically discarded before the queue included in the relay device is full. When the packets are stochastically discarded, more packets from the transmission device whose transmission amount is large are easily discarded than the packets from the transmission device whose transmission amount is small. Therefore, the RED method may control the occurrence of the global synchronization.

As for the congestion control of the RED method, there is a proposed technique for determining whether or not if the arriving cell is the final cell and discarding the cells other than the final cell at an arbitrary probability. Moreover, there is a proposed technique for reflecting a data storage state by discard control by acquiring distribution information of a queue length and performing packet discard according to the distribution information.

[Patent Document 1] Japanese Laid-open Patent Publication No. 2001-111556

[Patent Document 2] Japanese Laid-open Patent Publication No. 2004-104417

SUMMARY

According to an aspect of the invention, a packet relay device includes a plurality of queues which store packets waiting to be transmitted, a congestion detection unit which detects a congestion state of the plurality of queues and selects one or more queues from among the plurality of queues based on the congestion state, a distribution unit which separates a packet addressed to one or more of the queues selected by the congestion detection unit from a sequence of packets before being stored in the plurality of queues, and a discard unit which discards, at a prescribed probability, a packet addressed to one or more of the queues separated by the distribution unit.

The object and advantages of the invention will be realized and attained by at least the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 15 is a diagram illustrating an example of association between a RED circuit and a queue.

DESCRIPTION OF EMBODIMENTS

Figure 1:
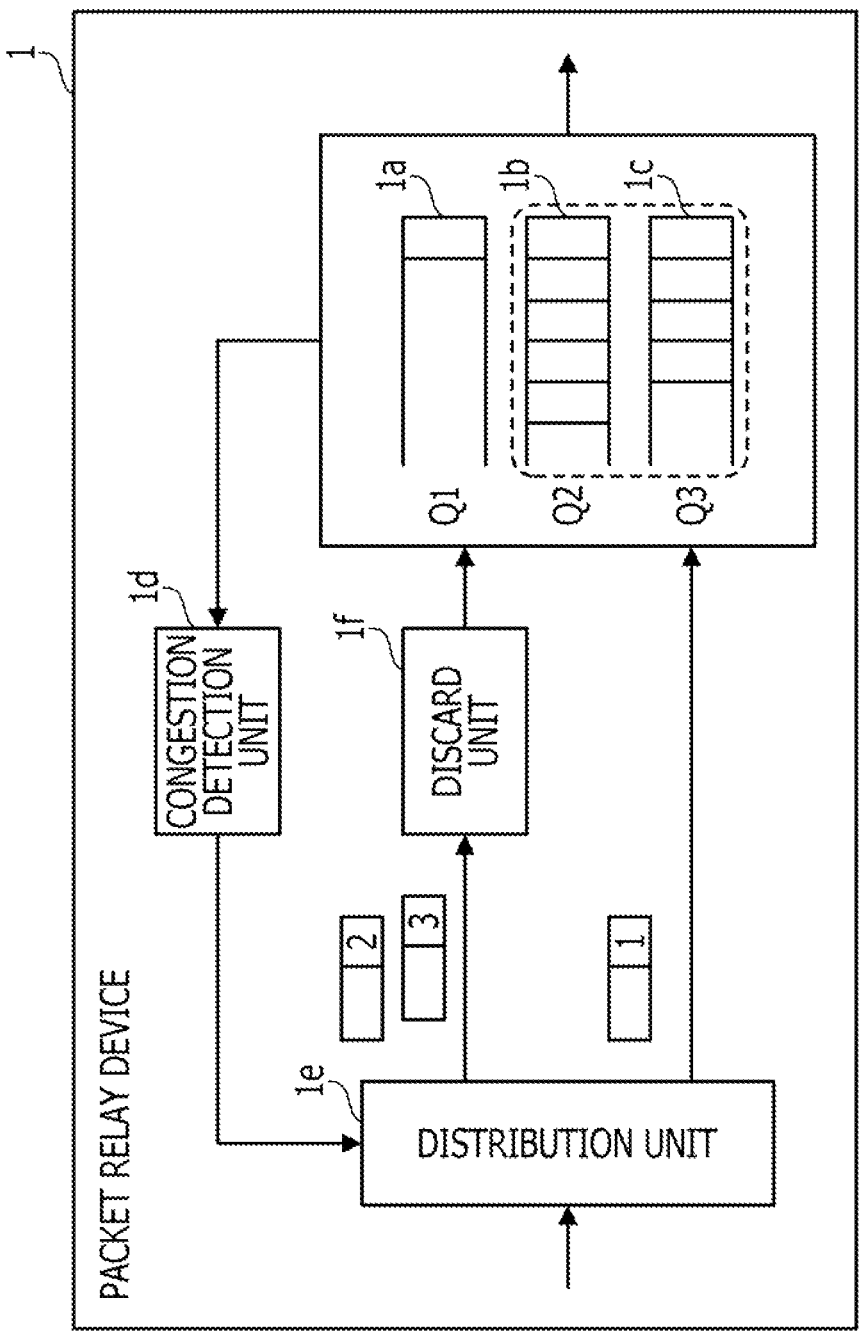
FIG. 1 is a diagram illustrating a packet relay device according to one embodiment.

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element layer between the two elements, or one or more intervening elements may also be present. Like reference numerals refer to like elements throughout.

For Quality of Service (QoS) control, a relay device relaying a packet may include a plurality of queues that store packets waiting to be transmitted. Since the relay device includes the plurality of queues, priorities may be put on a transmission order of the packets according to a user using a network or a type of communication.

However, in the congestion control method such as the RED method described above, the discard control of the packet is performed in a queue unit. Therefore, if a circuit for the packet discard is provided with respect to each of the queues, there is a problem that the circuit size increases. On the other hand, if the circuit for the packet discard is allocated to only some queues due to the circuit size limit, that is, if there is a queue that is out of control for the packet discard, there is a problem that the control of the global synchronization may be insufficient.

Embodiments of the present invention solve or at least minimize the above-described problems. For example, an aspect of the present invention is to provide a packet relay device and a congestion control method that effectively realize the control of the packet discard with respect to a plurality of queues.

Description will be made below of embodiments with reference to the figures. FIG. 1 is a diagram illustrating a packet relay device (hereinafter also referred to simply as "relay device") according to a first embodiment. A packet relay device 1 according to the first embodiment transfers a packet in a network. The packet relay device 1 is a communication device, for example, a router, a switch, or the like. The packet transferred by the packet relay device 1 is not limited to an Internet Protocol (IP) packet and is a fixed data unit that is divided for communication. The packet relay device 1 includes a plurality of queues $1a$, $1b$, and $1c$, a congestion detection unit $1d$, a distribution unit $1e$, and a discard unit $1f$.

The queues $1a$, $1b$, and $1c$ is store packets waiting to be transmitted. The queues $1a$, $1b$, and $1c$ is are provided in association with a user or a QoS class, for example. An output priority of the packet waiting to be transmitted is determined, and the output priority is inserted into the end of any one of the queues $1a$, $1b$, and $1c$. The packet stored in the queues $1a$, $1b$, and $1c$ is taken out from the head of the queue sequentially to be transmitted. A transmission side is provided with, for example, a scheduler that controls a transmission order of the packets of the queues $1a$, $1b$, and $1c$ is and a shaper that controls a transmission timing according to a band. A multi-stage shaper may be provided to realize a complicated QoS control.

The congestion detection unit $1d$ detects a congestion state of the queues $1a$, $1b$, and $1c$. Based on the detected congestion state, one or more queues as a packet discard object are selected from among the queues $1a$, $1b$, and $1c$. The congestion state unit $1d$ may detect the congestion state of the shaper. For example, there is a method for monitoring a passage state (for example, a use rate) of a packet of each shaper and a method for monitoring a stagnation state (for example, an average queue length for a recent fixed time) of the packet in the queue that outputs the packet to each of the shapers. In this case, the queue, which outputs the packet to the shaper that is determined to be congested, is selected as a packet discard object.

The distribution unit $1e$ acquires a sequence of packets before being stored in the queues $1a$, $1b$, and $1c$. The distribution unit $1e$ separates one or more packets selected from the sequence of the packets by the congestion detection unit $1d$, that is, the packets, which are addressed to the queue, as a packet discard object. If information indicating a destination queue or output priority is attached to the packet, the packet may be determined to be separated or not based on the information. The separated packet is distributed to the discard unit if. On the other hand, the other packets are stored in any one of the queues $1a$, $1b$, and $1c$.

The discard unit $1f$ acquires the packet separated by the distribution unit $1e$ and discards the acquired packet at a fixed discard probability. Any one of the queues $1a$, $1b$, and $1c$ is stores the packets that were not discarded. The discard probability may be a probability that is determined according to the stagnation state (for example, the average queue length for the recent fixed time) of the packet in the queue as a packet discard object. If a plurality of queues is the packet discard object, the discard probability may be calculated based on the total queue length or the maximum queue length of the queues thereof. The packet relay device 1 may include a plurality of discard units including the discard unit $1f$. In this case, different discard probabilities may be used for the respective discard units.

According to the above-described packet relay device 1, the congestion detection unit $1d$ detects a congestion state with respect to the queues $1a$, $1b$, and $1c$, and one or more queues are selected from among the queues $1a$, $1b$, and $1c$ is based on the congestion state. Out of the sequence of the packets before being stored in the queues $1a$, $1b$, and $1c$, the distribution unit $1e$ separates one or more packets addressed to the queue selected by the congestion detection unit $1d$. The discard unit if discards the packets, which were separated by the distribution unit $1e$, at the prescribed probability. The queues $1a$, $1b$, and $1c$ is store the packets that were not separated by the distribution unit $1e$ and the packets that were not discarded by the discard unit $1f$.

For example, many packets remain in the queues $1b$ and $1c$ from among the queues $1a$, $1b$, and $1c$, which is assumed to be a cause of congestion. Accordingly, the congestion detection unit $1d$ selects the queues $1b$ and is as a packet discard object. The distribution unit $1e$ distributes the packets addressed to the queues $1b$ and $1c$ to the discard unit $1f$, and the discard unit $1f$ discards the packets, which are addressed to the queues $1b$ and $1c$, at the prescribed probability.

This makes it possible to dynamically allocate one or more queues to the discard unit and to effectively realize the control of the packet discard with respect to the plurality of queues. That is, this makes it possible to reduce the circuit size compared to the method for fixedly associating the discard unit with each of all the queues in a one-to-one manner. Moreover, compared to the method for fixedly associating the discard unit with only some queues, this method may apply the processing of the packet discard to more queues, and distortion of communication quality due to the global synchronization may be reduced.

Compared to the method for fixedly associating the discard unit with the queues in a one-to-many manner, this makes it possible to reduce the distortion of the communication quality. That is, if the plurality of queues is fixedly associated with the discard unit, other queues that are not related to the congestion become a packet discard object when congestion occurs in only some queues. This may cause the distortion of the communication quality. On the other hand, according to the packet relay device 1, the discard unit is dynamically associated with one or more queues. This may reduce the distortion of the communication quality due to excess packet discard.

Especially when the congestion state is detected in the shaper unit for each shaper and the plurality of queues corresponding to the shaper are selected as a packet discard object, the queues that are considered to be related to the congestion of the shaper may be grouped properly. That is, the plurality of queues that are considered to be related to the congestion may be integrated into one virtual queue. Accordingly, the discard unit may be associated with the plurality of queues effectively.

Figure 2:
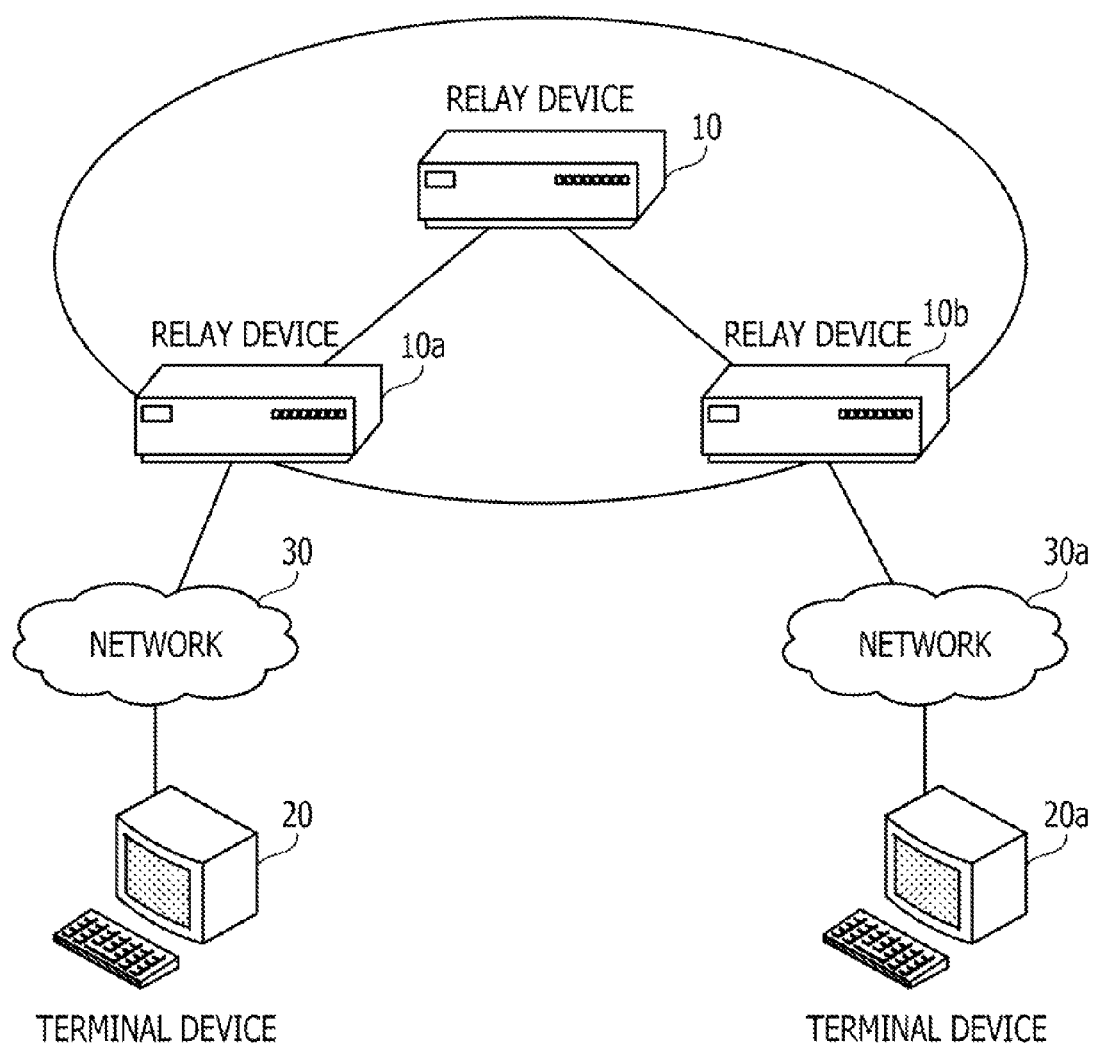
FIG. 2 is a diagram illustrating a communication system according to one embodiment.

FIG. 2 is a diagram illustrating a communication system according to one embodiment. The communication system according to the second embodiment is a system that may perform packet communication. This communication system includes relay devices 10, 10a, and 10b, terminal devices 20 and 20a, and networks 30 and 30a.

The relay devices 10, 10a, and 10b are communication devices that transfer a packet. For example, a router or a switch may be used as the relay devices 10, 10a, and 10b. The relay device 10 is connected to the relay devices 10a and 10b. The relay device 10a is connected to the network 30. The relay device 10b is connected to the network 30a. The packet transferred by the relay devices 10, 10a, and 10b may be a fixed data unit specified for the communication and may be an IP packet.

The terminal devices 20 and 20a are communication terminal devices that transmit and receive packets. For example, a computer that includes a communication interface may be used as the terminal devices 20 and 20a. To perform communication of Transmission Control Protocol (TCP), the terminal devices 20 and 20a end a TCP session. The terminal device 20 is connected to the network 30. The terminal device 20a is connected to the network 30a. The terminal device 20 may perform packet communication with the terminal 20a in a path of Network 30-Relay device 10a-Relay device 10-Relay device 10b-Network 30a.

Figure 3:
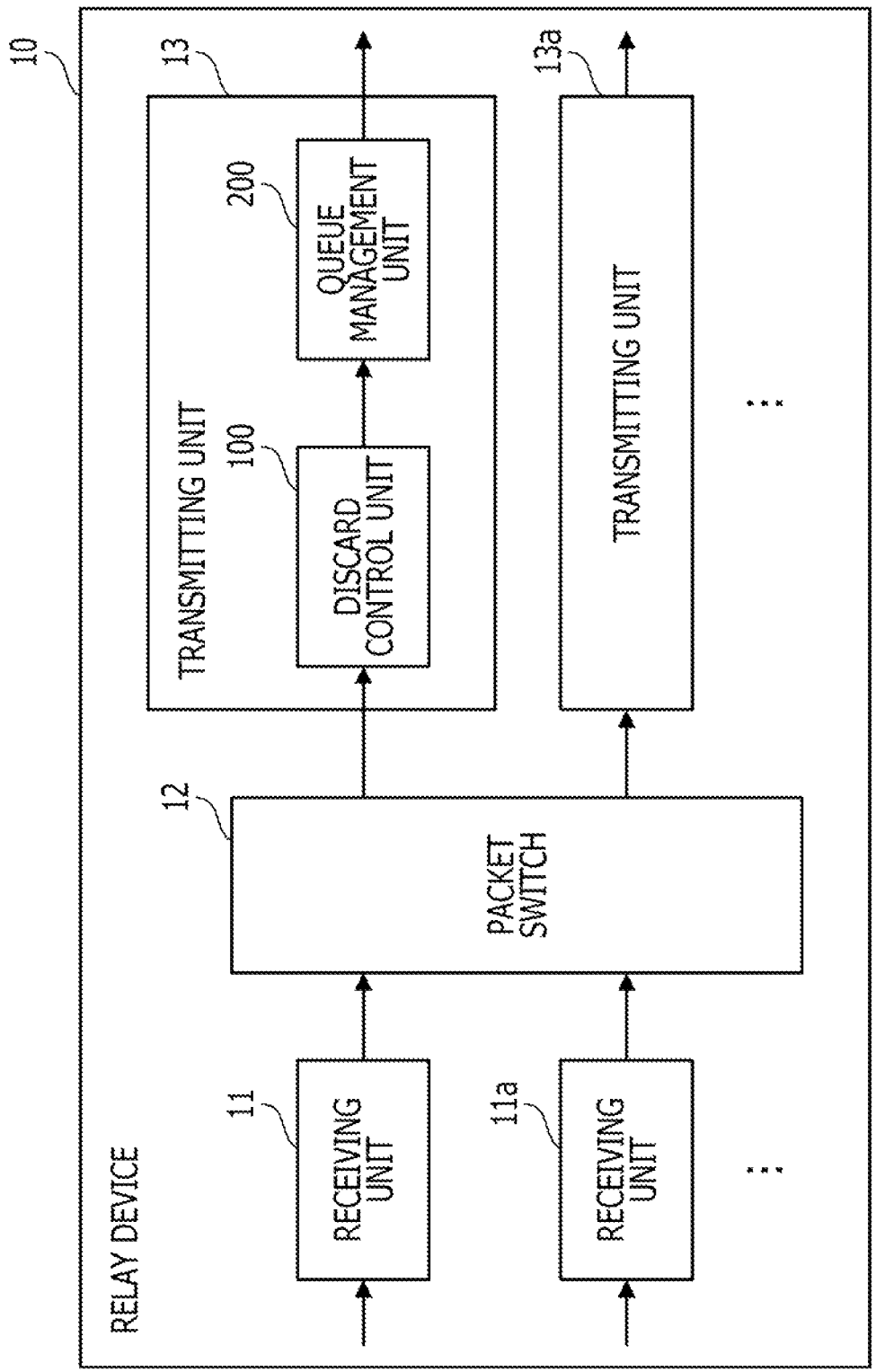
FIG. 3 is a diagram illustrating a relay device according to another embodiment.

FIG. 3 is a diagram illustrating a relay device according to an embodiment that may be used, for example, as the relay device 10 in the communication system shown in FIG. 2. The relay device 10 includes a plurality of receiving units 11, 11a, etc., a packet switch 12, and a plurality of transmitting units 13, 13a, etc. The relay device 10a and 10b in FIG. 2 may be realized by substantially the same configuration as of the relay device 10.

The receiving units 11, 11a, etc. acquire a reception packet that arrives in a communication port included in the relay device 10 and output the reception packet to the packet switch 12 after performing various receiving processing. Each of the receiving units may be provided in each communication port. For example, the receiving unit 11 processes the reception packet that arrives in the communication port connected to the relay device 10a, and the receiving unit 11a processes the reception packet that arrives in the communication port connected to the relay device 10b.

The receiving processing may include processing such as flow detection, band monitoring, and marking. In the flow detection, a flow is detected based on header information such as a protocol type, an IP address, and a TCP port number. In the band monitoring, a use band is monitored in each flow. In the marking, a value indicating the user priority in the header is rewritten according to a result of the band monitoring. For example, the user priority is decreased by giving a penalty to a flow exceeding a prescribed band.

The packet switch 12 is an internal switch used to distribute a packet to the communication port of the output destination. The packet switch 12 acquires the packets from the receiving units 11, 11a, etc. and determines the communication port of the output destination based on the header information. After that, the packet switch 12 outputs the packet to the transmitting unit corresponding to the communication port of the output destination.

The transmitting unit 13, 13a, etc. acquire the packet from the packet switch 12 and output the packet to the communication port after performing various transmitting processing. Each of the transmitting units may be provided in each communication port. For example, the transmitting unit 13 processes the packet to be output from the communication port connected to the relay device 10a, and the transmitting unit 13a processes the packet to be output from the communication port connected to the relay device 10b.

The transmitting processing may include processing such as priority determination, discard control, and output control. In the priority determination, the output priority of a packet is determined, and a queue that stores the packet is specified. In the discard control, packets are discarded according to the state of the queue. In the output control, control of an output order (scheduling) of the packets stored in a plurality of queues and control of an output timing (shaping) according to the allocated band are performed.

As illustrated in FIG. 3, the transmitting unit 13 includes a discard control unit 100 and a queue management unit 200. The discard control unit 100 discards the packet to be transmitted by the RED method. The queue management unit 200 includes a plurality of queues and performs the scheduling and the shaping of the packets stored in the queues. Other transmitting units including the transmitting unit 13a may be realized by the same configuration as of the transmitting unit 13.

Detailed description will be made below of the discard control unit 100 and the queue management unit 200. The second embodiment describes a case of performing the packet discard by the RED method. The packet discard may also be performed by a Weighted RED (WRED) method using information such as user priority.

Figure 4:
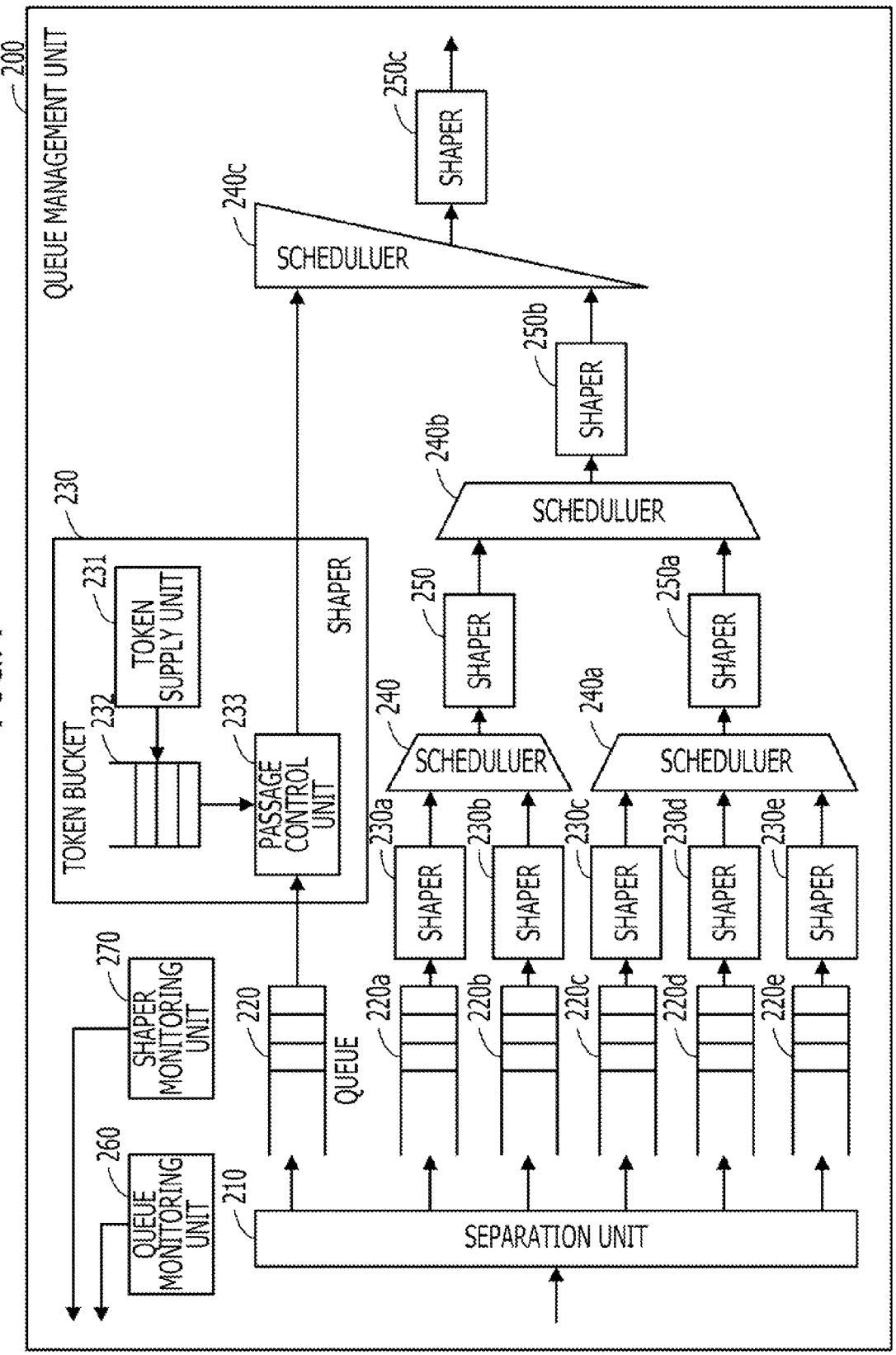
FIG. 4 is a diagram illustrating details of a queue management unit.

FIG. 4 is a diagram illustrating details of queue management unit 200. The queue management unit 200 includes a separation unit 210, queues 220, 220a, 220b, 220c, 220d, and 220e, shapers 230, 230a, 230b, 230c, 230d, 230e, 250, 250a, 250b, and 250c, schedulers 240, 240a, 240b, 240c, a queue monitoring unit 260, and a shaper monitoring unit 270.

The separation unit 210 stores the packet acquired from the discard control unit 100 in any one of the queues 220, 220a, 220b, 220c, 220d, and 220e. The queue in which the packet is stored is specified by the priority determination before the discard control is performed. Moreover, the separation unit 210 may determine, based on the header information of the packet, the queue in which the packet is stored.

The queues 220, 220a, 220b, 220c, 220d, and 220e are First In First Out (FIFO) type buffer memories that temporally store the packets waiting to be transmitted. According to the second embodiment, for example, six queues are provided in the queue management unit 200. These queues have different priorities of packet output. The queues 220, 220a, 220b, 220c, 220d, and 220e are added with the packets acquired from the separation unit 210 in the end thereof, and output the stored packets from the head thereof sequentially.

The queues 220, 220a, 220b, 220c, 220d, and 220e may be physical queues or logical queues. That is, a memory device may be provided for each of the queues separately, or a memory area of one memory device may be divided into a plurality of areas to realize a plurality of queues. In the latter case, the number of the logic queues may be increased or decreased according to a setting.

The shapers 230, 230a, 230b, 230c, 230d, 230e, 250, 250a, 250b, and 250c perform the control (shaping) of the output timing of the packet according to the allocated band. The shaping may level the amount of the packets to be output in a range of the allocated band according to a change of the amount of the arriving packets. A band is allocated to each of the shapers in advance. For example, a band of 15 Mbps is allocated to the shaper 230, and a band of 10 Mbps is allocated to the shaper 230a. The band allocated to the shaper 250c corresponds to the band of the communication port.

At this time, the shaper 230 acquires the packet from the queue 220 and outputs the packet to the scheduler 240c. The shapers 230a and 230b acquire the packet from the queue 220a and the queue 220b, respectively, and then output the packet to the scheduler 240. The shapers 230c, 230d, and 230e acquire the packet from the queues 220c, 220d, and 220e, respectively, and then output the packet to the scheduler 240a.

The shapers 250 and 250a acquire the packet from the schedulers 240 and 240a, respectively, and then output the packet to the scheduler 240b. The shaper 250b acquires the packet from the scheduler 240b and then outputs the packet to the scheduler 240c. The shaper 250c acquires the packet from the scheduler 240c and then outputs the packet from the communication port. As described above, the queue management unit 200 includes a multistage shaper. By using the multistage shaper, the complicated QoS control using the plurality of queues may be flexibly performed.

The shaper 230 includes a token supply unit 231, a token bucket 232, and a passage control unit 233. The shapers 230a, 230b, 230c, 230d, 230e, 250, 250a, 250b, and 250c may be realized by substantially the same or similar configuration as of the shaper 230.

The token supply unit 231 continuously generates data called a token at a time interval according to the band allocated to the shaper 230. The generated token is sequentially added to the end of the token bucket 232. The token bucket 232 is a FIFO type buffer memory that stores a token. The stored token may be taken out from the head of the token bucket 232 sequentially.

By using the token stored in the token bucket 232, the passage control unit 233 controls whether or not the packet passes. Specifically, the passage control unit 233 allows one packet to pass every time one token is taken out from the head of the token bucket. The passage control unit 233 allows no packet to pass while no token may be acquired as the token bucket is empty. This makes it possible to limit a passage rate of the packet.

The schedulers 240, 240a, 240b, and 240c perform the control (scheduling) of the output order of the packets input from a plurality of shapers of the former stage. That is, the scheduler 240 schedules the packets input from the shapers 230a and 230b. The scheduler 240a schedules the packets input from the shapers 230c, 230d, and 230e. The scheduler 240b schedules the packets input from the shapers 250 and 250a. The scheduler 240c schedules the packets input from the shapers 230 and 250b.

A scheduling algorithm may be set in each scheduler. For example, the scheduler 240a uses a Weighted Round Robin (WRR). In the WRR, each of the plurality of shapers is selected at a probability according to a prescribed weight. The scheduler 240b uses a Round Robin (RR). In the RR, the plurality of shapers is equally selected in a prescribed order. The scheduler 240c uses a Strict Priority (SP). In the SP, the shaper of high priority is preferentially selected, and the shaper of low priority may be selected only when no packet is input from the shaper of the high priority.

With respect to each of the queues 220, 220a, 220b, 220c, 220d, and 220e, the queue monitoring unit 260 monitors an amount of stagnant packets, that is, a queue length. The queue monitoring unit 260 reports information indicating the queue length to the discard control unit 100.

The shaper monitoring unit 270 monitors the use rate of each of the shapers 230, 230a, 230b, 230c, 230d, 230e, 250, 250a, 250b, and 250c. The use rate of the shaper may be determined based on the token amount stored in the token bucket. For example, if the token amount is continuously smaller than a prescribed threshold value for a fixed time, the use rate is determined to be 100 percent. The shaper monitoring unit 270 reports the information indicating the use rate of the shaper to the discard control unit 100.

Figure 5:
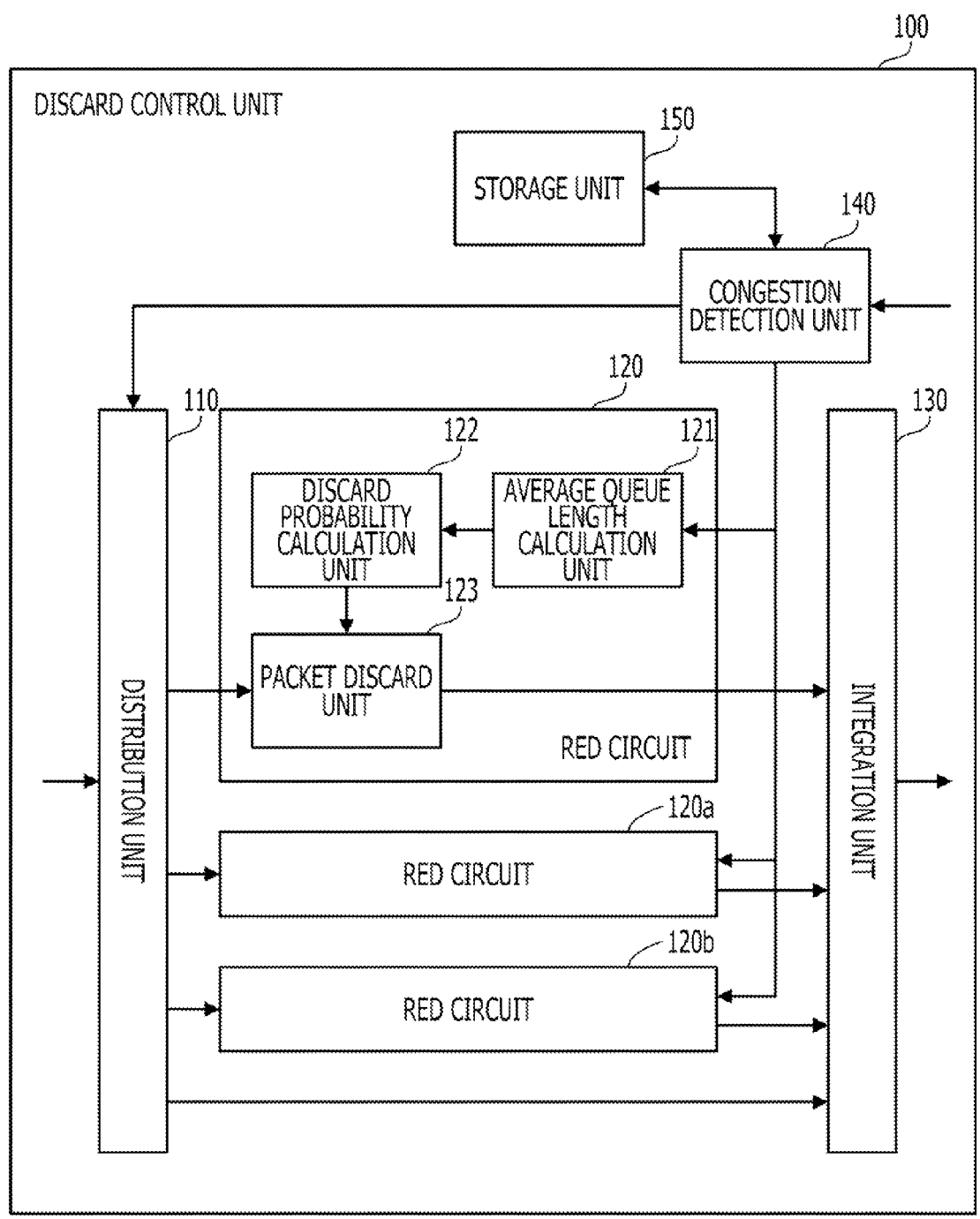
FIG. 5 is a diagram illustrating details of a discard control unit.

FIG. 5 is a diagram illustrating details of discard control unit 100. The discard control unit 100 includes a distribution unit 110, RED circuits 120, 120a, 120b, an integration unit 130, a congestion detection unit 140, and a storage unit 150.

The distribution unit 110 determines that an input packet is stored in any one of the queues 220, 220a, 220b, 220c, 220d, and 220e. According to the queue in which the packet is stored, the distribution unit 110 distributes the packet to any one of the RED circuits 120, 120a, and 120b, and the integration unit 130. An association relation between any one of the RED circuits 120, 120a, and 120b and the queue is reported from the congestion detection unit 140. The packet addressed to the queue that is not reported from the congestion detection unit 140 is distributed to the integration unit 130 without being distributed to any one of the RED circuits 120, 120a, and 120b.

The queue in which the packet is stored is specified by the priority determination performed before the packet is input to the discard control unit 100. Moreover, the distribution unit 110 may determine, based on the header information of the packet, the queue in which the packet is stored.

The RED circuits 120, 120a, and 120b stochastically discard the packets acquired from the distribution unit 110 and output the packets, which were not discarded, to the integration unit 130. That is, the packets are randomly taken out of the sequent of the acquired packets.

An initial state is a standby state in which no packet is distributed to the RED circuits 120, 120a, and 120b from the distribution unit 110. That is, vacant RED circuits are stocked. After that, when the packets are distributed by the control of the congestion detection unit 140, the RED circuits 120, 120a, 120b start the packet discard. When the distribution of the packets is stopped, the RED circuits 120, 120a, 120b stop the packet discard. According to the second embodiment, three RED circuits are provided. An arbitrary number of the RED circuits may be provided in consideration of the circuit size.

The RED circuit 120 includes an average queue length calculation unit 121, a discard probability calculation unit 122, and a packet discard unit 123. The RED circuits 120a and 120b may be realized by substantially the same or similar configuration as of the RED circuit 120.

When one or more queues applying the RED circuit 120 are reported from the congestion detection unit 140, the average queue length calculation unit 121 starts acquiring, via the congestion detection unit 140, the information of the queue length of the reported queue. By using the acquired information of the queue length, the average queue length calculation unit 121 calculates the average queue length for the recent fixed time and then reports the calculated average queue length to the discard probability calculation unit 122. The average queue length is calculated at, for example, a start time of the packet discard and a periodical timing in a later stage.

If there is a plurality of queues applying the RED circuit 120, a statistic value calculated based on the queue length of the queues may be defined as a virtual queue length in a case where the plurality of queues is considered as one queue. For example, the total queue length of the queues may be defined as a virtual queue length. In this method, the amount of stagnating packets in the plurality of queues may be acquired with high accuracy. Moreover, the maximum queue length of the queues may be defined as a virtual queue length. In this method, the circuit may be simplified, and the processing load may be reduced.

In the discard probability calculation unit 122, the association relation between the average queue length and the packet discard probability is set in advance. When the average queue length is reported from the average queue length calculation unit 121, the discard probability calculation unit 122 calculates the discard probability corresponding to the average queue length. The discard probability calculation unit 122 reports the calculated discard probability to the packet discard unit 123. After the packet discard starts, when the average queue is updated, the discard probability calculation unit 122 reports the discard probability corresponding to another average queue length to the packet discard unit 123.

When the discard probability is reported from the discard probability calculation unit 122, the packet discard unit 123 discards the packet, which is acquired from the distribution unit 110, at the reported discard probability. That is, the packets are randomly taken out of the sequence of the packets, which were acquired from the distribution unit 110, at a fixed discard probability. The packet discard unit 123 outputs the packets, which were not discarded, to the integration unit 130. After the packet discard starts, the packet discard unit 123 discards the packets at another discard probability when the discard probability is updated.

The integration unit 130 integrates the packets acquired from the distribution unit 110, the RED circuits 120, 120a, and 120b into one stream. The sequence of the integrated packets is output to the queue management unit 200.

The congestion detection unit 140 controls application of the RED circuits 120, 120a, and 120b corresponding to the queues 220, 220a, 220b, 220c, 220d, and 220e. Specifically, the congestion detection unit 140 continuously acquires the information of the use rate of each of the shapers from the shaper monitoring unit 270 of the queue management unit 200. If the use rate exceeds a prescribed threshold value, the congestion detection unit 140 determines that the shaper is congested. The threshold value of the use rate may be a common value for all the shapers or may be different for each of the shapers.

If congestion occurs in a shaper, the congestion detection unit 140 specifies a queue corresponding to the shaper, that is, one or more queues that allow the packet to flow into the shaper, and selects the RED circuit to apply. The congestion detection unit 140 reports the queue to the selected RED circuit and reports the association relation between the queue and the RED circuit to the distribution unit 110. Moreover, the congestion detection unit 140 continuously or periodically acquires the information of the queue length from the queue monitoring unit 260 of the queue management unit 200 and outputs the information to the selected RED circuit.

At this time, a prescribed queue may be set to be out of application object of the packet discard. For example, a queue with high priority may be set to be out of the application object of the packet discard. In this case, the congestion detection unit 140 reports, to the distribution unit 110 and the selected RED circuit, the queue excluding the queue that is out of the application object of the packet discard. If the congestion is eliminated in a shaper, the congestion detection unit 140 specifies the queue corresponding to the shaper and the applied RED circuit, and instructs the distribution unit 110 to release the association between the queue and the RED circuit.

As described above, by performing the congestion detection based on the information of the use rate of the shaper, occurrence and elimination of the congestion may be quickly detected. On the other hand, the congestion detection may be performed based on the information of the queue length. In this case, the congestion detection unit 140 calculates the total queue length of one or more queues corresponding to each of the shapers. If the total queue length exceeds the prescribed threshold value, the congestion detection unit 140 determines that the shaper is congested. In this method, the queue management unit 200 does not require the shaper monitoring unit 270. As a result, the circuit size may be reduced.

The storage unit 150 stores various information to be used for processing of the congestion detection unit 140. For example, a nonvolatile memory is used as the storage unit 150. The information stored in the storage unit 150 includes information indicating the queue corresponding to the respective shapers and information indicating the queue applying the RED circuits 120, 120a, and 120b. The latter information is properly overwritten by the congestion detection unit 140.

Figure 6:
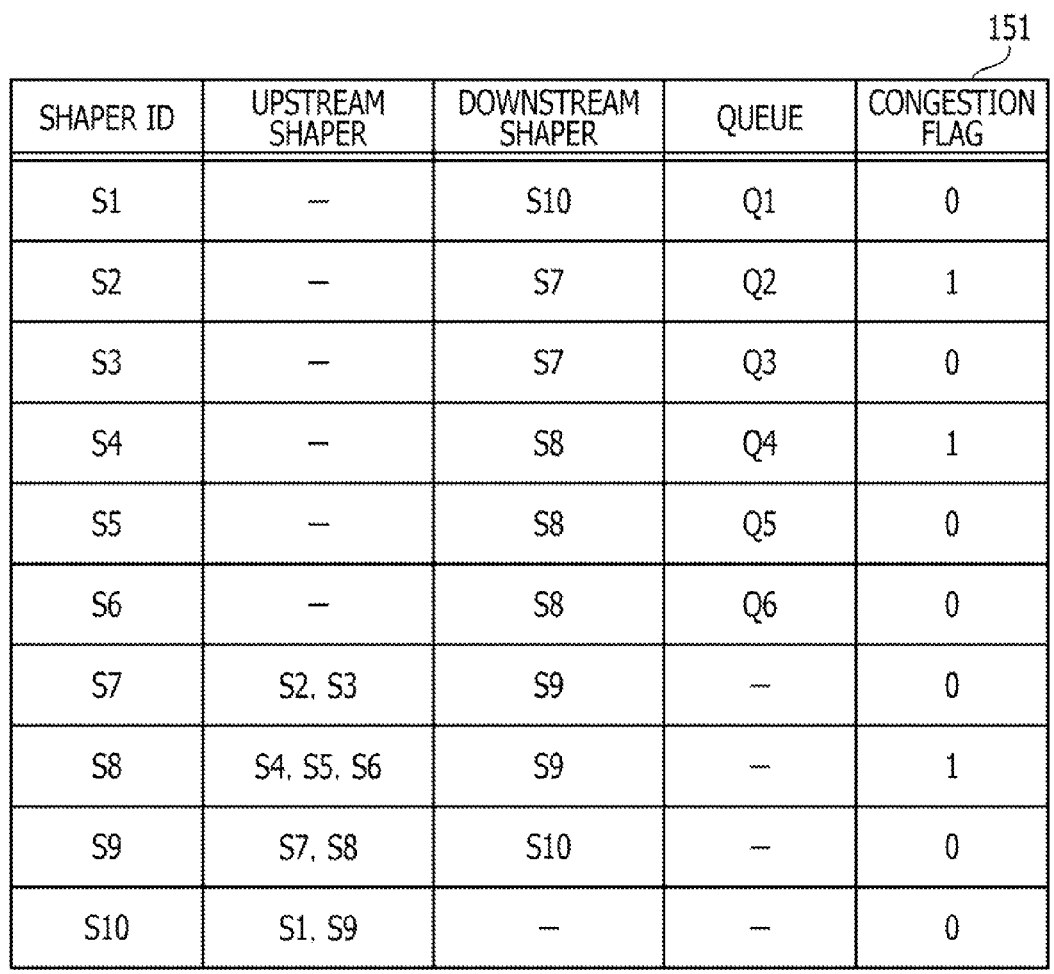
FIG. 6 is a diagram illustrating a data configuration example of a shaper table.

FIG. 6 is a diagram illustrating a data configuration example of a shaper table. A shaper table 151 illustrated in FIG. 6 is stored in the storage unit 150 of the discard control unit 100. The shaper table 151 includes items indicating a shaper IDentification (ID), an upstream shaper, a downstream shaper, a queue, and a congestion flag. The various information arranged in a transverse direction of the items are associated with each other to configure shaper information of the respective shapers.

Identification information used to identify the shaper is set in the item of the shaper ID. As referenced herein, shapers 230, 230a, 230b, 230c, 230d, 230e, 250, 250a, 250b, and 250c correspond to shaper IDs S1, S2, S3, S4, S5, S6, S7, S8, S9, and S10, respectively. The identification information of another shaper connected to the upstream side (the side close to the queues 220, 220a, 220b, 220c, 220d, and 220e) of the shaper is set in the item of the upstream shaper. The identification information of the other shaper connected to the downstream side (the side close to the communication port of the output destination) of the shaper is set in the item of the downstream shaper. The identification information of the queue directly connected to the shaper is set in the item of the queue. The value indicating whether or not the shaper is congested is set in the item of the congestion flag. If the shaper is congested, the value 1 is set. If the shaper is not congested, the value 0 is set.

For example, the shaper information indicating Shaper ID=S7, Upstream shaper=S2 and S3, Downstream shaper=S9, and Congestion flag=0 is stored in the shaper table 151. This indicates that the shapers 230a and 230b are connected to the upstream side of the shaper 250, that the shaper 250b is connected to the downstream side of the shaper 250, and that the shaper 250 is not congested. The information in the item of the congestion flag is properly overwritten by the congestion detection unit 140.

Figure 7:
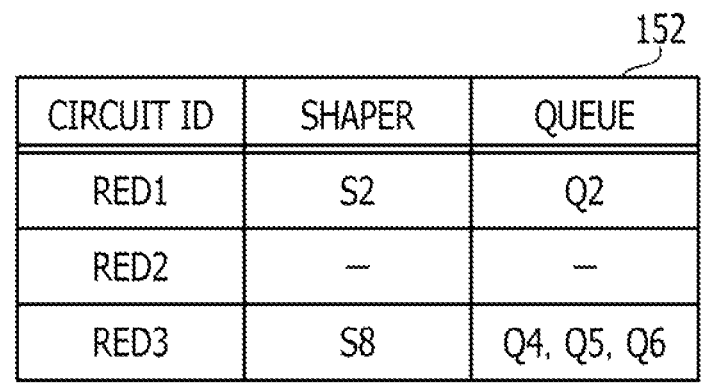
FIG. 7 is a diagram illustrating a data configuration example of a RED circuit table.

FIG. 7 is a diagram illustrating a data configuration example of a RED circuit table. A RED circuit table 152 illustrated in FIG. 7 is stored in the storage unit 150 of the discard control unit 100. The RED circuit table 152 includes items indicating a circuit ID, a shaper, and a queue. The various information arranged in the transverse direction in the items are associated with each other to configure RED circuit information of the respective RED circuits.

The identification information used to identify the RED circuits 120, 120a, and 120b are set in the item of the circuit ID. The identification information of the shaper applying the RED circuit, that is, the identification information of the shaper in which the congestion is to be eliminated is set in the item of the shaper. The identification information of the queue to which the RED circuit is applied is set in the item of the queue.

For example, RED circuit information indicating Circuit ID=RED 3, Shaper=S8, and Queue=Q4, Q5, and Q6 is stored in the RED circuit table 152. This indicates that the RED circuit 120b is used to eliminate the congestion of the shaper 250a, and that the RED circuit 120b processes the packets addressed to the queues 220c, 220d, and 220e. The information in the items of the shaper and the queue are properly overwritten by the congestion detection unit 140.

Figure 8:
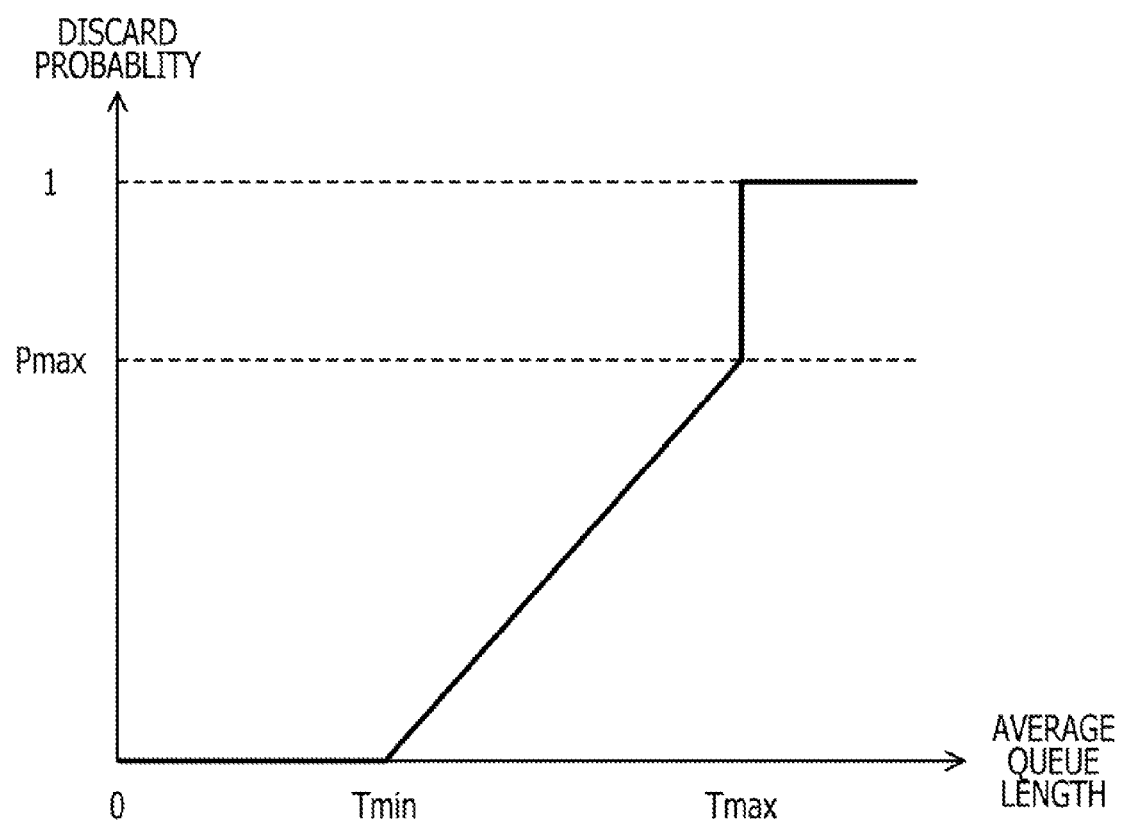
FIG. 8 is a graph illustrating a relation between an average queue length and a discard probability.

FIG. 8 is a graph illustrating a relation between an average queue length and a discard probability. According to the graph (probability curve) illustrated in FIG. 8, the discard probability calculation unit 122 of the RED circuit 120 determines the discard probability based on the average queue length calculated by the average queue length calculation unit 121. The RED circuits 120a and 120b perform a similar control.

Specifically, if the average queue length is equal to or smaller than a threshold value T min, the discard probability is set to 0. If the average queue length is larger than the threshold value T min and is smaller than the threshold value T max (T min<T max), the discard probability is set to P (0<P<P max<1). If the average queue length is equal to the threshold value T max, the discard probability is set to P max. If the average queue length is larger than the threshold value T max, the discard probability is set to 1.

That is, if the average queue length is equal to or smaller than the threshold value T min, the packets to be input pass through the RED circuits 120, 120a, and 120b without being discarded. If the average queue length is larger than the threshold value T max, all the packets to be input are discarded without passing through the RED circuits 120, 120a, or 120b. If the average queue length is larger than threshold value T min and is equal to or smaller than the threshold value T min, some of the packets to be input are randomly discarded, and the remaining packets pass through the RED circuits 120, 120a, and 120b.

The RED circuits 120, 120a, and 120b may use a common probability curve for an arbitrary combination of the queues 220, 220a, 220b, 220c, 220d, and 220e or may use different probability curves according to the combination.

Figure 9:
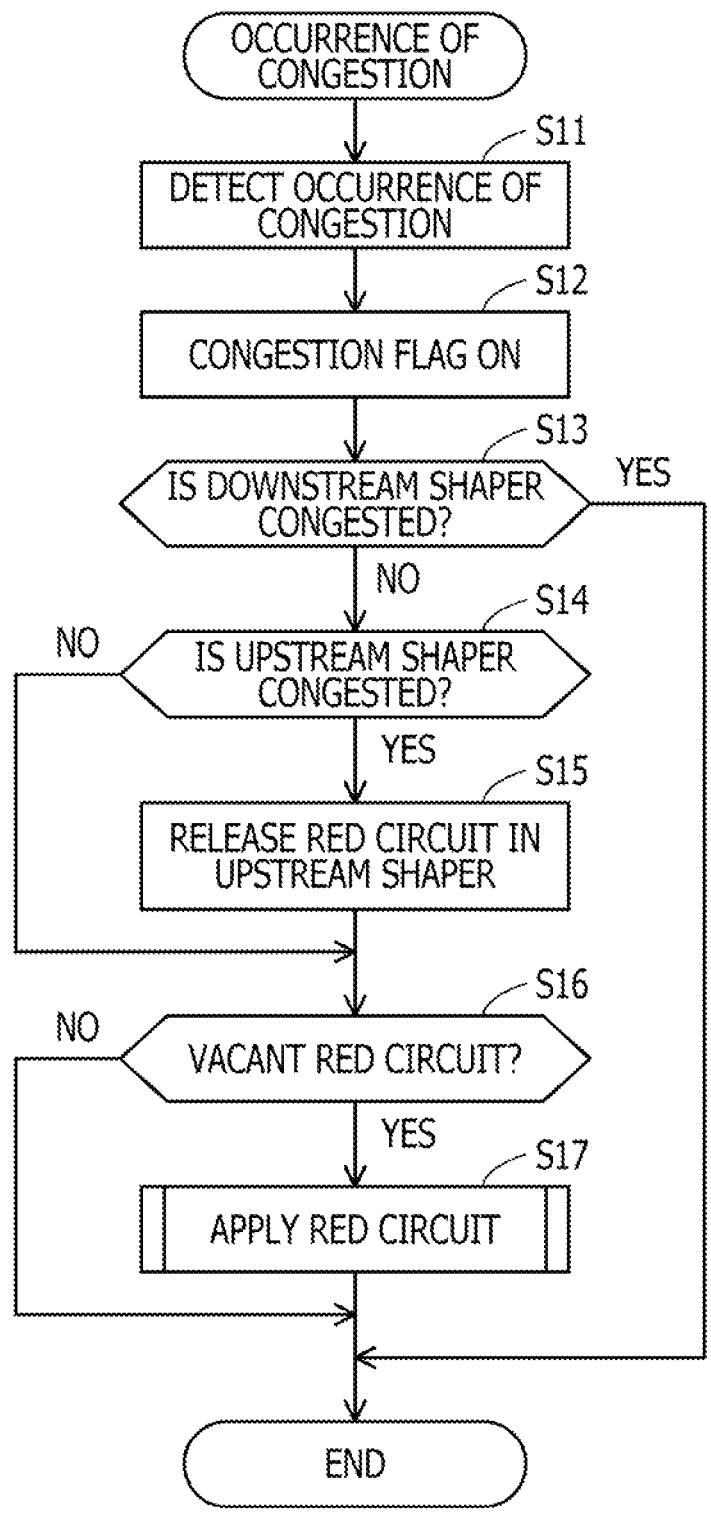
FIG. 9 is a flowchart illustrating processing in occurrence of congestion.

FIG. 9 is a flowchart illustrating processing at occurrence of congestion. Description will be made below of the processing illustrated in FIG. 9 according to the operation numbers.

(Operation S11) The congestion detection unit 140 monitors the shaper that is not congested, that is, the shaper with the congestion flag OFF (0) in the shaper table 151, and detects the congested shaper. For example, the congestion detection unit 140 determines that congestion occurs in the shaper if, for example, the use rate of the shaper exceeds a prescribed threshold value. Alternatively, the congestion detection unit 140 determines that the congestion occurs in the shaper if the total queue length of the corresponding queues (the queues allowing the packet to flow into the shaper) exceeds the prescribed threshold value.

(Operation S12) In the shaper table 151, the congestion detection unit 140 changes the congestion flag of the shaper detected in Operation S11, so that the congestion flag is changed from OFF (0) to ON (1). (Operation S13) The congestion detection unit 140 searches the shaper table 151 and determines whether or not if there is a congested shaper in the downstream of the shaper detected in Operation S11, that is, between the shaper thereof and the communication port. If yes, the processing ends. If no, the process goes to Operation S14.

(Operation S14) The congestion detection unit 140 searches the shaper table 151 and determines whether or not if there is a congested shaper in the upstream of the shaper detected in Operation S11, that is, between the corresponding queue and the shaper thereof. If yes, the process goes to Operation S15. If no, the process goes to Operation S16.

(Operation S15) The congestion detection unit 140 searches the RED circuit table 152 and specifies the RED circuit that is applied to the congested shaper in the upstream. Then the congestion detection unit 140 releases the specified RED circuit. Specifically, the congestion detection unit 140 deletes, from the RED circuit table 152, the identification information of the shaper and queue associated with the specified RED circuit. Moreover, the congestion detection unit 140 instructs the distribution unit 110 to release the association between the queue corresponding to the congested shaper in the upstream and the specified RED circuit. If there is a plurality of congested shapers in the upstream, the processing is performed for each of the shapers.

(Operation S16) The congestion detection unit 140 searches the RED circuit table 152 and determines whether or not if any of the RED circuits 120, 120a, 120b is a vacant RED circuit. If the item of the shaper and the item of the queue are blank, the RED circuit thereof may be determined as a vacant RED circuit. If there is a vacant RED circuit, the process goes to Operation S17. If there is no vacant RED circuit, the processing ends.

(Operation S17) The congestion detection unit 140 applies the RED circuit to the shaper detected in Operation S11. The processing will be described in detail below. As described above, the discard control unit 100 detects the congestion state in the shaper unit based on the use state of the shaper or the stagnation state of the queue. If there is a congested shaper, the RED circuit is applied to the shaper.

However, if there is a congested shaper in the downstream, another RED circuit is not applied. This is because the queue associated with the detected shaper is already covered by the RED circuit that is applied to the shaper in the downstream. If there is a congested shaper in the upstream, the RED circuit applied to the shaper in the upstream is released. This is because the queue associated with the shaper in the upstream is covered by the RED circuit that is applied to the detected shaper. As described above, if a plurality of shapers in upstream-downstream relations is congested, the RED circuit is applied to the shaper in the downstream.

In the flowchart illustrated in FIG. 9, after the RED circuit applied to the shaper in the upstream is released, the RED circuit to be applied to the detected shaper is selected. The flow order of the release and the selection may be reversed if there is a vacant RED circuit. Moreover, one of the RED circuits applied to the shaper in the upstream may be used as an RED circuit to be applied to the detected shaper.

Figure 10:
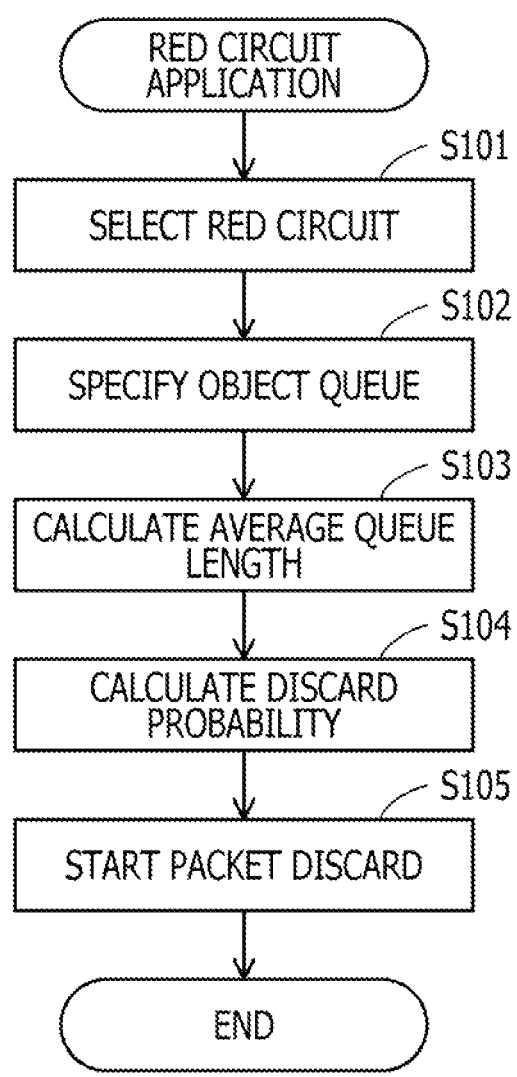
FIG. 10 is a flowchart illustrating processing for applying a RED circuit.

FIG. 10 is a flowchart illustrating processing for applying a RED circuit. This processing is performed in the above-described Operation S17. The processing illustrated in FIG. 10 will be described below according to the operation numbers.
(Operation S101) The congestion detection unit 140 searches the RED circuit table 152 and selects, from among vacant RED circuits, the RED circuit to be applied to the shaper detected in the above-described Operation S11. The RED circuit to be applied may be randomly selected or may be selected according to a prescribed rule. For the latter method, there may be rules such as determining the priority order of the RED circuits 120, 120a, and 120b in advance, determining the priority order for each shaper, and selecting the RED circuit to avoid bias of the use rate of each of the RED circuits.

(Operation S102) The congestion detection unit 140 searches the shaper table 151 and specifies one or more queues associated with the detected shaper. The congestion detection unit 140 registers, in the RED circuit table 152, the identification information of the detected shaper and the identification information of the specified queue in association with the RED circuit selected in Operation 101. The specified queue is reported to the selected RED circuit. Description will be made below of a case where the RED circuit 120 is selected.

(Operation S103) The average queue length calculation unit 121 starts acquiring the information of the queue length of the queue reported from the congestion detection unit 140. The average queue length calculation unit 121 calculates the average queue length for the recent fixed time. If there is a plurality of reported queues, the total queue length of the queues is considered to be a virtual queue length with respect to all of the plurality of queues. Alternatively, the maximum queue length of the queues is considered to be a virtual queue length. The virtual queue length is time-averaged and calculated as an average queue length. Other methods may be used to calculate the average queue length.

(Operation S104) The discard probability calculation unit 122 calculates a discard probability of the packet based on the average queue length calculated by the average queue length calculation unit 121 in Operation S103. For example, the discard probability of the packet may be calculated based on the probability curve illustrated in FIG. 8. The probability curve may be different according to the queue as a packet discard object or to the shaper.

(Operation S105) The congestion detection unit 140 instructs the distribution unit 110 to distribute the packet, which is addressed to the queue specified in Operation S102, to the RED circuit 120. The packet discard unit 123 stochastically discards the packet acquired from the distribution unit 110 according to the discard probability calculated by the discard probability calculation unit 122 in Operation S104, and outputs, to the integration unit 130, the packets that were not discarded.

As described above, the discard control unit 100 selects, from among the stocked RED circuits 120, 120*a*, and 120*b*, the RED circuit to be applied to the congested shaper. The selected RED circuit calculates the discard probability according to the stagnation state of the queue corresponding to the congested shaper and stochastically discards the packet addressed to the queue at the calculated discard probability. After the packet discard starts the calculation of the average queue length and the discard probability may be performed continuously or periodically, and that the discard probability is changed according to a change of the state of the queue.

Figure 11:
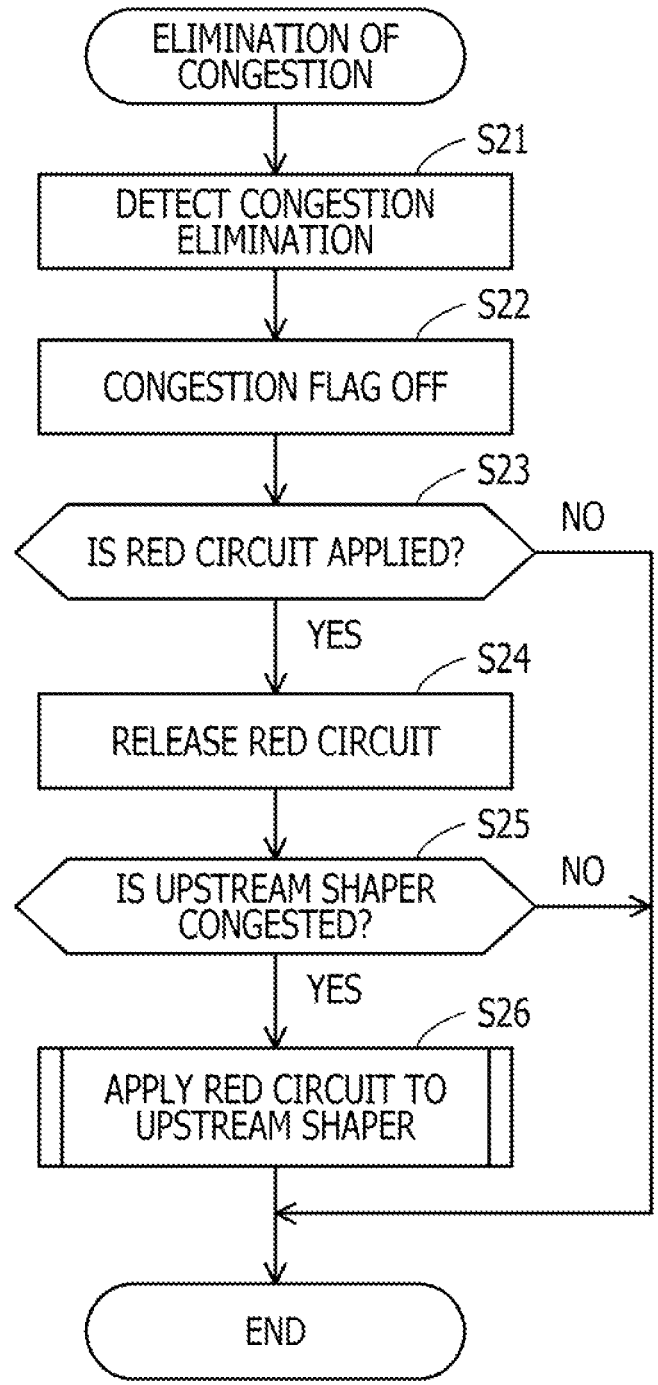
FIG. 11 is a flowchart illustrating processing in elimination of congestion.

FIG. 11 is a flowchart illustrating processing in elimination of congestion. Description will be made below of processing illustrated in FIG. 11 according to the operation numbers.

(Operation S21) The congestion detection unit 140 monitors the congested shaper, that is, the shaper whose congestion flag indicates ON (1) in the shaper table 151, and detects the shaper whose congestion is eliminated. The congestion detection unit 140 determines, for example, that the congestion is eliminated in the shaper if the use rate thereof is equal or smaller than the prescribed threshold value. Alternatively, the congestion detection unit 140 determines that the congestion is eliminated in the shaper if the total queue length of the corresponding queues is equal to or smaller than the prescribed threshold value. The threshold value used to detect occurrence of the congestion may be different from the threshold value used to detect elimination of the congestion.

In this case, for example, the latter threshold value may be set to be smaller than the former threshold value.

(Operation S22) The congestion detection unit 140 changes the congestion flag of the shaper detected in Operation S21 from ON (1) to OFF (0) in the shaper table 151.

(Operation S23) The congestion detection unit 140 searches the RED circuit table 152 and determines whether or not if the RED circuit is applied to the detected shaper. If yes, the process goes to Operation S24. If no, the processing ends.

(Operation S24) The congestion detection unit 140 specifies the RED circuit applied to the detected shaper. Then, the congestion detection unit 140 releases the specified RED circuit. Specifically, the congestion detection unit 140 deletes, from the RED circuit table 152, the identification information of the detected shaper and the identification information of the corresponding queue. Moreover, the congestion detection unit 140 instructs the distribution unit 110 to release the association between the queue corresponding to the detected shaper and the specified RED circuit.

(Operation S25) The congestion detection unit 140 searches the shaper table 151 and determines whether or not if there is a congested shaper in the upstream of the detected shaper, that is, between the corresponding queue and the detected shaper. If yes, the process goes to Operation S26. If no, the processing ends.

(Operation S26) From among the congested shapers in the upstream, the congestion detection unit 140 selects one or more shapers positioned in the furthermost downstream. The RED circuit is applied to each of the selected shapers. By a similar flow as in FIG. 10, the RED circuit may be applied.

As described above, the discard control unit 100 detects the congestion state in the shaper unit based on the use state of the shaper or the stagnation state of the queue. If there is a shaper whose congestion is eliminated, the RED circuit applied to the shaper is released.

If there is a congested shaper in the upstream, the RED circuit is applied to the shaper in the upstream. This is because the queue corresponding to the shaper in the upstream is not covered by the RED circuit if the RED circuit is not applied to the shaper whose congestion is eliminated. As described above, if there is a plurality of shapers in upstream-downstream relations and only the congestion of the shaper in the downstream is eliminated, application of the RED circuit is shifted to the shaper in the upstream.

In the flowchart illustrated in FIG. 11, after the RED circuit applied to the shaper whose congestion is eliminated is released, the RED circuit to be applied to the shaper in the upstream is selected. The flow order of the release and the selection may be reversed if there is a vacant RED circuit. Moreover, the RED circuits applied to the shaper whose congestion is eliminated may be used as an RED circuit to be applied to the shaper in the upstream.

Figure 12:
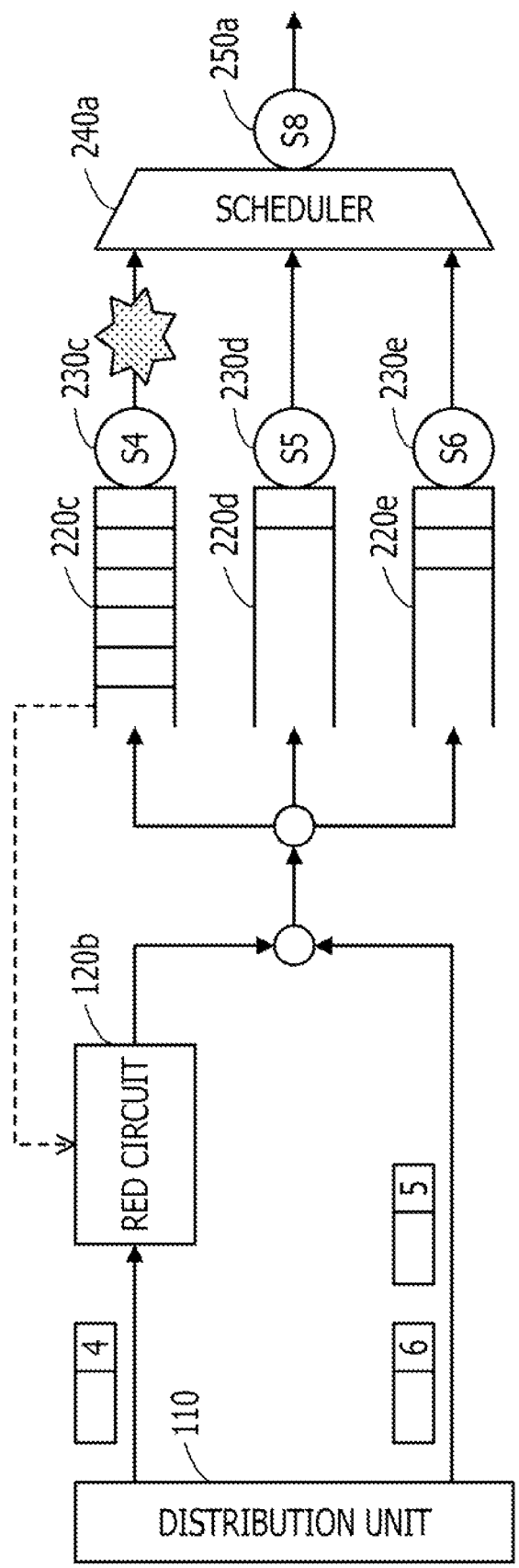
FIG. 12 is a first diagram illustrating an example of packet distribution.

FIG. 12 is a first diagram illustrating an example of packet distribution. It is assumed that congestion occurs in the shaper 230*c* and that no congestion occurs in the shapers in the downstream including the shapers 230*d*, 230*e*, and 250*a*. Therefore, any one of the RED circuits 120, 120*a*, and 120*b* is applied to the shaper 230*c*. In this example, the RED circuit 120*b* is applied.

As further illustrated in FIG. 12, the distribution unit 110 distributes the packets addressed to the queue 220*c* to the RED circuit 120*b*. The RED circuit 120*b* calculates the discard probability based on the average queue length of the queue 220*c*. The packet addressed to the queue 220*c* is stochastically discarded. The queue 220*c* stores the packets that were not discarded. On the other hand, the packets addressed to the queues 220d and 220e are not distributed to the RED circuit 120b prior to being stored in the queues 220d and 220e.

Figure 13:
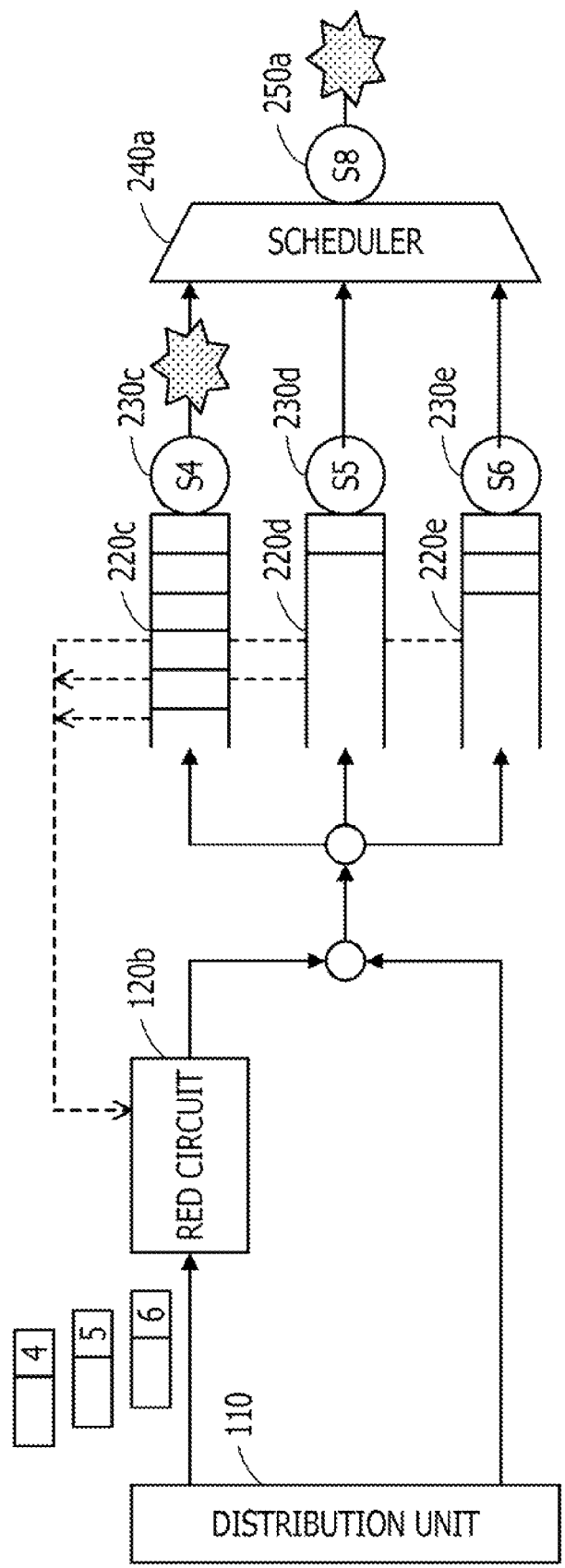
FIG. 13 is a second diagram illustrating an example of the packet distribution.

FIG. 13 is a second diagram illustrating an example of the packet distribution. It is assumed that the congestion occurs in the shaper 250a as well as in the shaper 230c and that no congestion occurs in the shapers in the downstream of the shaper 250a. Therefore, any one of the RED circuits 120, 120a, and 120b is applied to the shaper 250a. No RED circuit is required to be applied to the shaper 230c. In this example, the RED circuit 120b is applied to the shaper 250a.

As further illustrated in FIG. 13, the distribution unit 110 distributes the packets addressed to the queues 220c, 220d, and 220e to the RED circuit 120b. The RED circuit 120b calculates the discard probability based on the average queue length of the queues 220c, 220d, and 220e. Then the packets addressed to the queues 220c, 220d, and 220e are stochastically discarded. The queues 220c, 220d, and 220e store the packets that were not discarded.

Figure 14:
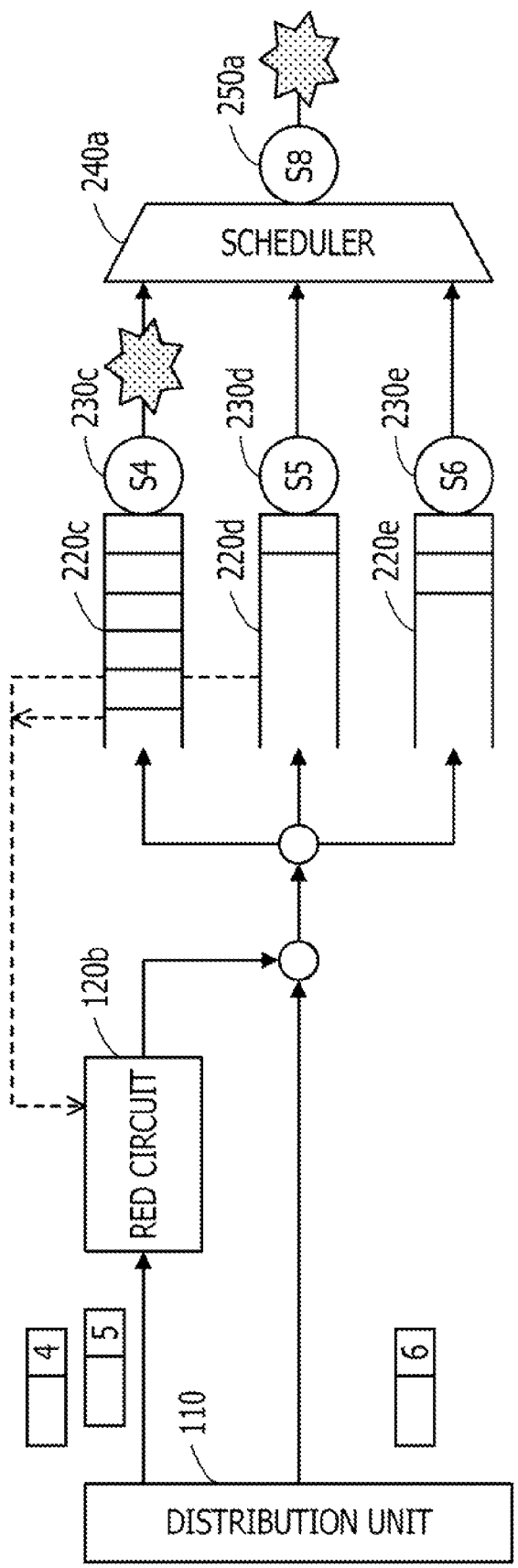
FIG. 14 is a third diagram illustrating an example of the packet distribution.

FIG. 14 is a third diagram illustrating an example of the packet distribution. As with FIG. 13, it is assumed that the congestion occurs in the shapers 230c and 250a and that no congestion occurs in the shapers in the downstream of the shaper 250a. Therefore, any one of the RED circuits 120, 120a, and 120b is applied to the shaper 250a. In this example, the RED circuit 120b is applied. However, the queue 220e is assumed to be set out of packet discard object in advance.

In this case, the distribution unit 110 distributes the packets addressed to the queues 220c and 220d to the RED circuit 120b. The RED circuit 120b calculates the discard probability based on the average queue length of the queues 220c and 220d. Then the packets addressed to the queues 220c and 220d are stochastically discarded. The queues 220c and 220d store the packets that were not discarded. On the other hand, the packet addressed to the queue 220e is out of RED circuit application object, and, therefore, the packet is not distributed to the RED circuit 120b prior to being stored in the queue 220e.

FIG. 15 is a diagram illustrating an example of association between a RED circuit and a queue. In this case, the congestion occurs in the shaper 230a, and no congestion occurs in the shaper 250, 250b, and 250c in the downstream of the shaper 230a. The congestion occurs in the shaper 230c and 250a, and no congestion occurs in the shapers 250b and 250c in the downstream of the shaper 250a.

For example, the RED circuit 120 and the RED circuits 120b are applied to the shaper 230a and the shaper 250a, respectively. In this case, the RED circuit 120 acquires the packet addressed to the queue 220a and stochastically discards the acquired packet. The RED circuit 120b acquires the packets addressed to the queues 220c, 220d, and 220e and stochastically discards the acquired packets.

According to relay devices 10, 10a, and 10b of the second embodiment, one or more queues corresponding to the congested shaper may be dynamically associated with any of a plurality of stocked RED circuits. This makes it possible to effectively realize the control of packet discard with respect to a plurality of queues.

That is, this makes it possible to reduce the circuit size, compared to the method for fixedly associating the RED circuit with all the queues. Moreover, compared to the method for fixedly associating the RED circuit with only some queues, RED processing may be applied to more queues, which makes it possible to reduce the distortion of the communication quality.

One or more queues corresponding to the congested shaper, that is, the queue that is considered to be related to the congestion as one virtual queue to apply the RED circuit. This makes it possible to reduce probability that the packet addressed to the queue that is not related to the congestion is discarded excessively, and to easily control the association between the RED circuit and the queue that is preferable to be a packet discard object.

By detecting the congestion based on the passage state of the packet of each of the shapers, quick congestion detection may be realized. On the other hand, by detecting the congestion based on the stagnation state of the packet in the queue corresponding to each of the shapers, the circuit may be simplified. When the average queue length corresponding to the plurality of queues is calculated, calculation accuracy of the average queue length may be improved if the total queue length of the queues is considered as a virtual queue length. On the other hand, if the maximum queue length is considered as a virtual queue length, load reduction and circuit simplification may be performed. By setting the specific queue to be out of the packet discard object, more flexible QoS control may be performed.

According to the second embodiment, the RED circuit is dynamically associated with the shaper in a one-to-one manner. This makes it possible to easily perform control for eliminating the congestion of a specific shaper. However, if the RED circuits are not enough, the RED circuit may be associated with the shapers in a one-to-many manner. That is, one RED circuit may correspond to a plurality of shapers.

The embodiments may be implemented by electric circuits. The embodiements may be implemented via execution of a computer program by a processor in the relay device, too. The computer program may be stored in non-transitory computer-readable storage media.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention.

What is claimed is:

1. A packet relay device comprising:
 a memory configured to store a plurality of queues which store packets waiting to be transmitted; and
 a processor configured,
  to perform a plurality of shapers which correspond to the plurality of queues and control a transmission timing of the packets stored in the plurality of corresponding queues,
  to detect a congestion state of the plurality of queues and selects one or more queues from among the plurality of queues based on the congestion state,
  to separate a packet addressed to one or more of the queues selected from a sequence of packets before being stored in the plurality of queues, and
  to discard, at a prescribed probability, a packet addressed to one or more of the queues separated by the distribution unit,
 wherein the processor detects the congestion state of the plurality of queues based on detecting the congestion state of the plurality of shaper, and when the congestion state of one of the plurality of shapers is detected to be congested, selects a queue corresponding to the congested shaper.

2. The packet relay device according to claim 1, wherein the processor detects the congestion state of the plurality of shaper units based on a passage state of a packet in each shaper.

3. The packet relay device according to claim 1, wherein the congestion detection unit detects the congestion state of the plurality of shapers based on a stagnation state of the packet in the queue corresponding to each shaper.

4. The packet relay device according to claim 1, wherein the plurality of shapers includes a first shaper and a second shaper to which a packet which passes through the first shaper is input, and wherein when the processor detects that the first shaper and the second shaper are congested, the processor selects a queue corresponding to the second shaper.

5. The packet relay device according to claim 1, further comprising the processor calculates a stagnation state of a packet in one or more of the queues selected by the processor, wherein the prescribed probability is based on the calculated stagnation state.

6. The packet relay device according to claim 5, wherein the processor calculates the stagnation state based on a total queue length of one or more of the queues.

7. The packet relay device according to claim 5, wherein the processor calculates the stagnation state based on a maximum queue length of one or more of the queues.

8. The packet relay device according to claim 1, wherein the processor excludes a prescribed queue from among the plurality of queues regardless of the congestion state.

9. A congestion control method comprising:

detecting a congestion state of a plurality of queues, which store packets waiting to be transmitted;

selecting one or more of the plurality of queues based on the congestion state;

separating a packet addressed to one or more of the queues from a sequence of packets before being stored in the plurality of queues; and discarding the separated packet, which is addressed to one or more of the queues, at a prescribed probability;

wherein the plurality of queues correspond to a plurality of shaper units which control a transmission timing of the packets stored in the plurality of corresponding queues, and wherein the detecting detects the congestion state of the plurality of queues based on detecting the congestion state of the plurality of shaper units, and when the congestion state of one of the plurality of shaper units is detected to be congested, selects a queue corresponding to the congested shaper.

10. The congestion control method according to claim 9, wherein the detecting detects the congestion state of the plurality of shaper units based on a passage state of a packet in each shaper.

11. The congestion control method according to claim 9, wherein the detecting detects the congestion state of the plurality of shaper units based on a stagnation state of the packet in the queue corresponding to each shaper.

12. The congestion control method according to claim 9, wherein the plurality of shaper units includes a first shaper and a second shaper to which a packet which passes through the first shaper is input, and wherein when the first shaper and the second shaper are detected to be congested, selecting a queue corresponding to the second shaper.

13. The congestion control method according to claim 9, wherein the congestion control method further comprising calculating a stagnation state of a packet in one or more of the queues selected by the congestion detection unit, and wherein the prescribed probability is based on the calculated stagnation state.

14. The congestion control method according to claim 13, wherein the calculating calculates the stagnation state based on a total queue length of one or more of the queues.

15. The congestion control method according to claim 13, wherein the calculating calculates the stagnation state based on a maximum queue length of one or more of the queues.

16. The congestion control method according to claim 9, wherein the detecting excludes a prescribed queue from among the plurality of queues regardless of the congestion state.

* * * * *